United States Patent
Ronda et al.

(10) Patent No.: US 9,140,808 B2
(45) Date of Patent: Sep. 22, 2015

(54) SINGLE OR MULTI-ENERGY VERTICAL RADIATION SENSITIVE DETECTORS

(75) Inventors: Cornelis Reinder Ronda, Aachen (DE); Simha Levene, Kibbuts Sa'Ad (IL); Raz Carmi, Haifa (IL); Naor Wainer, Zichron Yaakov (IL); Amir Livne, Zichron Ya'Aqov (IL); Roman Shiriaev, Haifa (IL)

(73) Assignee: Koninklijke Philips N.V., Eindhoven (NL)

(*) Notice: Subject to any disclaimer, the term of this patent is extended or adjusted under 35 U.S.C. 154(b) by 30 days.

(21) Appl. No.: 13/979,866

(22) PCT Filed: Jan. 30, 2012

(86) PCT No.: PCT/IB2012/050426
§ 371 (c)(1),
(2), (4) Date: Jul. 16, 2013

(87) PCT Pub. No.: WO2012/104775
PCT Pub. Date: Aug. 9, 2012

(65) Prior Publication Data
US 2013/0327947 A1   Dec. 12, 2013

Related U.S. Application Data

(60) Provisional application No. 61/439,077, filed on Feb. 3, 2011.

(51) Int. Cl.
*G01T 1/20* (2006.01)
*G01T 1/164* (2006.01)
(52) U.S. Cl.
CPC ............. *G01T 1/2006* (2013.01); *G01T 1/1644* (2013.01); *G01T 1/2018* (2013.01)
(58) Field of Classification Search
CPC ........................................................ G01T 1/20
USPC ..................................................... 250/362, 366
See application file for complete search history.

(56) References Cited

U.S. PATENT DOCUMENTS 6,292,528 B1 *  9/2001  Wieczorek et al. ............. 378/19
6,667,480 B2   12/2003  Kajiwara et al.
(Continued)

FOREIGN PATENT DOCUMENTS

EP       2224264 A1    9/2010
WO    2010137396 A1   12/2010

OTHER PUBLICATIONS van Loef et al: "Crystal Growth and Scintillation Properties of Strontium Iodide Scintillators"; IEEE Transactions on Nuclear Science, vol. 56, No. 3, Jun. 2009, pp. 869-872.
(Continued)

*Primary Examiner* — Marcus Taningco
*Assistant Examiner* — Djura Malevic

(57) ABSTRACT

A vertical radiation sensitive detector array (114) includes at least one detector leaf (118). The detector leaf includes a scintillator array (210, 502, 807, 907), including, at least, a top side (212) which receives radiation, a bottom side (218) and a rear side (214) and a photo-sensor circuit board (200, 803, 903), including a photo-sensitive region (202, 508, 803, 903), optically coupled to the rear side of the scintillator array. The detector leaf further includes processing electronics (406) disposed below the scintillator array, a flexible circuit board (220) electrically coupling the photo-sensitive region and the processing electronics, and a radiation shield (236) disposed below the bottom of the scintillator array, between the scintillator and the processing electronics, thereby shielding the processing electronics from residual radiation passing through the scintillator array. Some embodiments incorporate rare earth iodides such as SrI 2 (Eu).

16 Claims, 7 Drawing Sheets

(56) References Cited

U.S. PATENT DOCUMENTS

| | | | |
|---|---|---|---|
| 6,707,066 B2 * | 3/2004 | Morishita | 257/59 |
| 6,838,673 B2 * | 1/2005 | Morishita | 250/370.09 |
| 6,982,423 B2 * | 1/2006 | Elgali | 250/370.11 |
| 7,259,376 B2 * | 8/2007 | Pohan | 250/370.09 |
| 7,364,620 B2 | 4/2008 | Jones | |
| 7,379,528 B2 * | 5/2008 | Mattson et al. | 378/19 |
| 7,582,879 B2 | 9/2009 | Abenaim et al. | |
| 7,655,919 B1 | 2/2010 | Shah et al. | |
| 8,391,439 B2 * | 3/2013 | Levene et al. | 378/5 |
| 2002/0070343 A1 * | 6/2002 | Hoffman | 250/367 |
| 2003/0234363 A1 * | 12/2003 | Sekine et al. | 250/370.11 |
| 2005/0236573 A1 | 10/2005 | Vogtmeier | |
| 2007/0057192 A1 * | 3/2007 | Vogtmeier et al. | 250/370.11 |
| 2007/0221858 A1 | 9/2007 | Abenaim et al. | |
| 2008/0011959 A1 | 1/2008 | Thorne | |
| 2008/0131348 A1 | 6/2008 | Srivastava et al. | |
| 2008/0237470 A1 * | 10/2008 | Loureiro et al. | 250/361 R |
| 2008/0253507 A1 | 10/2008 | Levene et al. | |
| 2010/0001209 A1 * | 1/2010 | Osinski et al. | 250/459.1 |
| 2010/0044576 A1 | 2/2010 | Payne et al. | |
| 2010/0220833 A1 | 9/2010 | Levene et al. | |
| 2010/0268074 A1 * | 10/2010 | Van Loef et al. | 600/431 |

OTHER PUBLICATIONS

Nikl: "Scintillation Detectors for X-Rays"; Meas. Sci. Technology, vol. 17 (2006), pp. R37-R54.

Cherepy et al: "Scintillators With Potential to Supersede Lanthanum Bromide"; 2008, pp. 1-8.

* cited by examiner

SINGLE OR MULTI-ENERGY VERTICAL RADIATION SENSITIVE DETECTORS

FIELD OF THE INVENTION

The following generally relates to imaging and more particularly to single and/or multi-energy vertical radiation sensitive detectors, and is described with particular application to computed tomography (CT); however, the following is also amenable to non-CT imaging modalities such as single photon emission computed tomography (SPECT), positron emission tomography (PET), digital x-radiology, and/or other imaging modalities.

BACKGROUND OF THE INVENTION

A conventional computer tomography (CT) scanner includes an x-ray tube that emits ionizing x-ray radiation that traverses an examination region and a patient therein and illuminates a detector array disposed across the examination region from the x-ray tube. The detector array has included a plurality of single-energy integrating detectors, each including a gadolinium oxysulfide (GOS) or other scintillator array optically coupled to a photo-sensor array. A dual-energy detector has included a first scintillator array having a material (e.g., zinc selenide (ZnSe)) for absorbing lower energy "soft" x-ray photons and another scintillator array having a material (e.g., GOS) for absorbing higher energy "hard" x-ray photons.

The x-ray radiation illuminates the scintillator array, which absorbs the x-ray photons and, in response, emits optical photons indicative of the absorbed x-ray photons. The photo-sensor array detects the optical photons and generates an electrical (current or voltage) signal indicative of the detected optical photons. Inevitably, some residual x-ray photons pass through the scintillator without being absorbed by the scintillator array. A reconstructor reconstructs the photo-sensor output signals and generates volumetric image data indicative of the scanned patient. With dual-energy detectors, images can be generated for each energy level and/or the data can be combined to generate an image similar to a single-energy system.

X-ray photons traversing the patient are attenuated and absorbed by the patient as a function of the radiodensity of the tissue being traversed, and the energy deposited in the patient generally is referred to as deposited or patient dose. Unfortunately, such ionizing radiation can damage cells. A trend in CT has been to reduce patient dose, including for screening asymptomatic patients, and/or imaging younger populations, patients undergoing recurrent scans, etc. However, reducing patient dose adversely affects image noise, which is mainly dominated by Poissonic ("quantum") noise of the x-ray photons arriving at the detector. Furthermore, the attempt to image with relatively lower dose in conventional CT scanners creates significant excess image noise and artifacts when, for example, the electronic signals generated by the detector are close to the level of the electronic noise.

Almost all scintillators have some optical absorption in addition to the optical emission (due to x-ray absorption). This optical absorption is proportional to the distance that the light photons travel as they are scattered to the photo-detector. As such, increasing the height of a vertical photo-detector (where the photo-detector is mounted to the side of the scintillator relative to the direction of the incident radiation) without increasing x-ray photon absorption can reduce optical photon absorption and, thus, increase the level of the electronic signals generated by the detector.

Another trend in CT has been to increase spatial resolution, while maintaining a predefined coverage area. The resolution can be increased by reducing, given a fixed distance from the x-ray focal spot, the dimensions of the detectors. However, in order to maintain the predetermined coverage area with detectors having a reduced dimension, more detectors are required, which may increase the overall cost of the detection system. Furthermore, in order to maintain a given signal to noise level for an image, the electrical circuitry on a detector should be located as closely as possible to the photo-detector to reduce additional electronic noise. A relatively higher level of performance can be achieved when the electrical circuitry is next to the photo-sensor. However, placing the circuitry in such a location requires either blocking residual the x-ray radiation from reaching the electrical circuitry (e.g., via a radiation shield) or using radiation hardened electrical circuitry, which, respectively, can consume more area and/or increase detector cost.

SUMMARY OF THE INVENTION

Aspects of the present application address the above-referenced matters and others.

According to one aspect, a vertical radiation sensitive detector array includes at least one detector leaf. The detector leaf includes a scintillator array, including, at least, a top side which receives radiation, a bottom side and a rear side and a photo-sensor circuit board, including a photo-sensitive region, optically coupled to the rear side of the scintillator array. The detector leaf further includes processing electronics disposed below the scintillator array, a flexible circuit board electrically coupling the photo-sensitive region and the processing electronics, and a radiation shield disposed below the bottom of the scintillator array, between the scintillator and the processing electronics, thereby shielding the processing electronics from residual radiation passing through the scintillator array.

According to another aspect, a method includes detecting radiation via at least one detector leaf of a detector array of an imaging system, generating a signal indicative of the detected radiation, and reconstructing the signal, generating volumetric image data. The detector leaf includes a scintillator array, including, at least, a top side which receives radiation, a bottom side and a rear side and a photo-sensor circuit board, including a photo-sensitive region, optically coupled to the rear side of the scintillator array. The detector leaf further includes processing electronics disposed below the scintillator array, a flexible circuit board electrically coupling the photo-sensitive region and the processing electronics, and a radiation shield disposed below the bottom of the scintillator array, between the scintillator and the processing electronics, thereby shielding the processing electronics from residual radiation passing through the scintillator array.

According to another aspect, a radiation sensitive detector array includes a top scintillator array with a halide based scintillator and at least one other scintillator array disposed below the top scintillator array. The radiation sensitive detector array further includes a photo-sensor optically coupled to the scintillator array and configured to detect optical photons emitted by the top and at least one other scintillator arrays emitted in response to the top and at least one other scintillator arrays absorbing x-ray photons.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Figure 1:
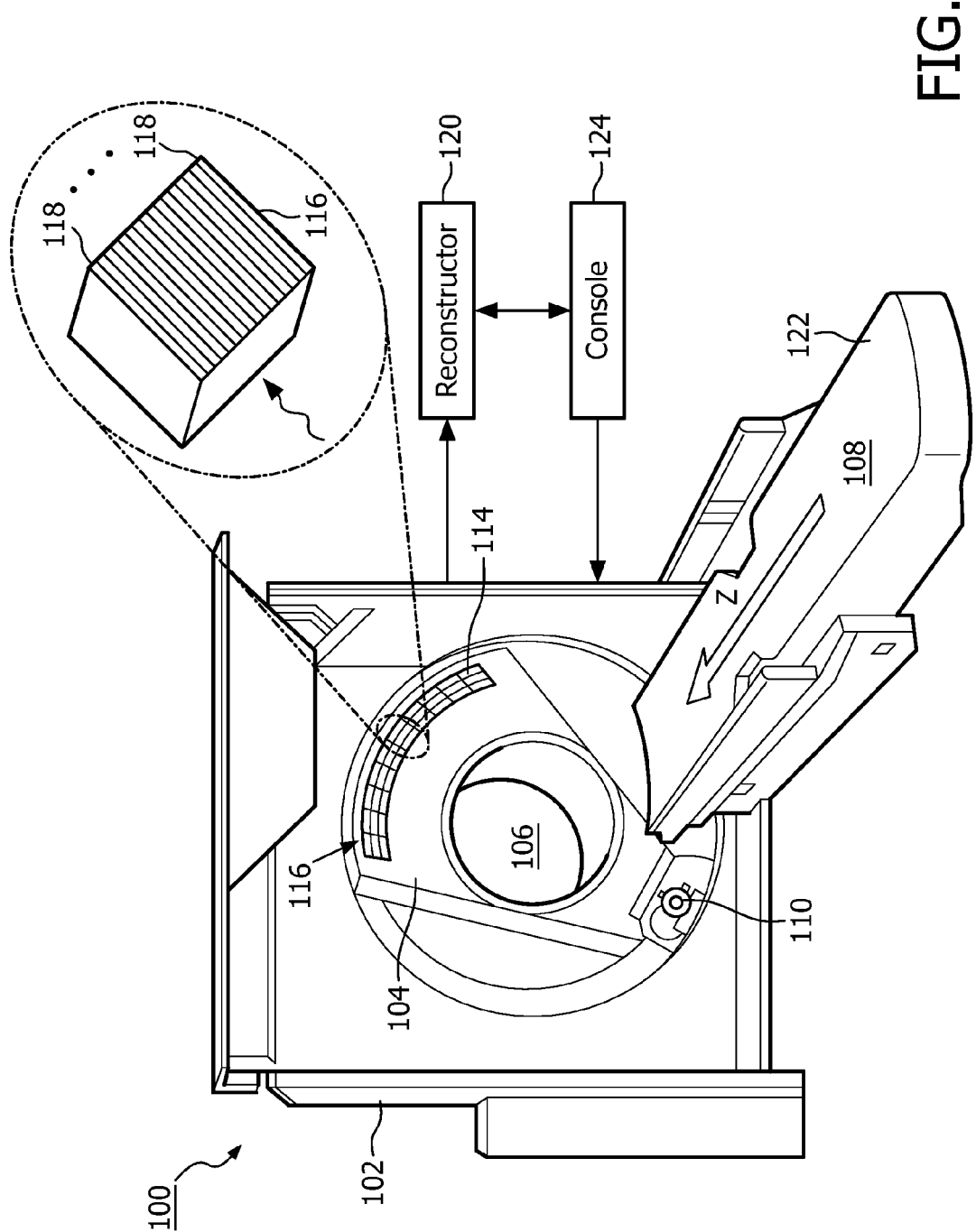
FIG. 1 illustrates an example imaging system with a detector array including a plurality of tiles with a plurality of vertical detector leaves.

FIG. 1 illustrates an imaging system 100 such as a computed tomography (CT) scanner. The imaging system 100 includes a stationary gantry 102 and a rotating gantry 104, which is rotatably supported by the stationary gantry 102. The rotating gantry 104 rotates around an examination region 106 about a longitudinal or z-axis 108. A radiation source 110, such as an x-ray tube, is supported by and rotates with the rotating gantry 104, and emits radiation (e.g., x-ray photons). A source collimator (not shown) collimates the emitted radiation to form a generally cone, fan, wedge, or otherwise shaped radiation beam that traverses the examination region 106 and an object (e.g., luggage, etc.) or subject (human or animal) therein.

A radiation sensitive detector array 114 is affixed to the rotating gantry 104 and subtends an angular arc, across from the radiation source 110, opposite the examination region 106. The illustrated detector array 114 includes a plurality of detector tiles 116 stacked along a transverse axis (in the x/y plane), which is transverse to the z-axis 108. As shown, a detector tile 116 includes a plurality of detector leaves 118 stacked with respect to each other along the transverse axis and extending along the z-axis direction. In another embodiment, the detector array 114 alternatively includes a plurality of detector modules or an extended array of single detectors.

As described in greater detail below, in one embodiment, a detector leaf 118 generally includes a plurality of single or multi-energy vertical detection portions extending along the z-axis direction, in which a vertical detection portion includes a one or multi-dimensional scintillator array (including conventional ceramic scintillators such as GOS, and crystalline or ceramic scintillators such as halide based scintillators, and composite scintillators comprising powdered scintillator in a resin or plastic medium, and/or other scintillation materials) each element of which is optically coupled to a respective corresponding element in the one or multi-dimensional photo-sensor array.

The detector leaf 118 further includes processing electronics located under or below the vertical detection portions with respect to the direction of the incoming x-ray photons, a flexible printed circuit board (PCB) electrically coupling the photo-sensor arrays of the vertical detection portions and the processing electronics, and a radiation shield affixed to the flexible PCB between the vertical detection portions and the processing electronics, shielding the processing electronics from residual radiation traversing the vertical detection portions. The radiation shield mitigates having to use radiation-hardened components in the processing electronics, which can reduce cost relative to a configuration in which radiation hardened components are used in the processing electronics. Furthermore, the flexible PCB allows for reducing detector cost relative to a configuration in which a more expensive ceramic based PCB is used and may be less susceptible cracking relative to a rigid or other PCB.

The radiation sensitive detector array 114, in response to detecting x-ray photons, generates and outputs a signal (or projection data) indicative of the detected radiation. In a configuration in which the vertical detection portion includes a multi-dimensional scintillator array (with layers having different x-ray energy absorption characteristics) optically coupled to a complementary multi-dimensional photo-sensor array, spectral information can be derived by measuring the x-ray absorption along the depth of the scintillator array, and conventional CT measurements can be made by summing the outputs of the elements of the multi-element photodiode array in the same ray path.

A reconstructor 120 reconstructs the signal or projection data using a spectral or conventional reconstruction algorithm, and generates volumetric image data indicative of the examination region 106. One or more spectral or conventional images can be generated from the volumetric image data. A subject support 122, such as a couch, supports an object or subject in the examination region 106. The support 122 is movable along the x, y and z-axes in coordination with the rotation of the rotating gantry 104 to facilitate helical, axial, or other desired scanning trajectories.

A general purpose computing system serves as an operator console 124, which includes human readable output devices such as a display and/or printer and input devices such as a keyboard and/or mouse. The console 124 includes one or more processors configured to execute computer readable instructions (software), encoded or embodied on local and/or remote computer readable storage medium (such as physical memory), which allow the operator to control an operation of the system 100, for example, by allowing the operator to select a spectral or conventional scan protocol, initiate/terminate scanning, etc. Additionally or alternatively, the instructions can be carried via signal medium or a carrier wave.

Figure 2:
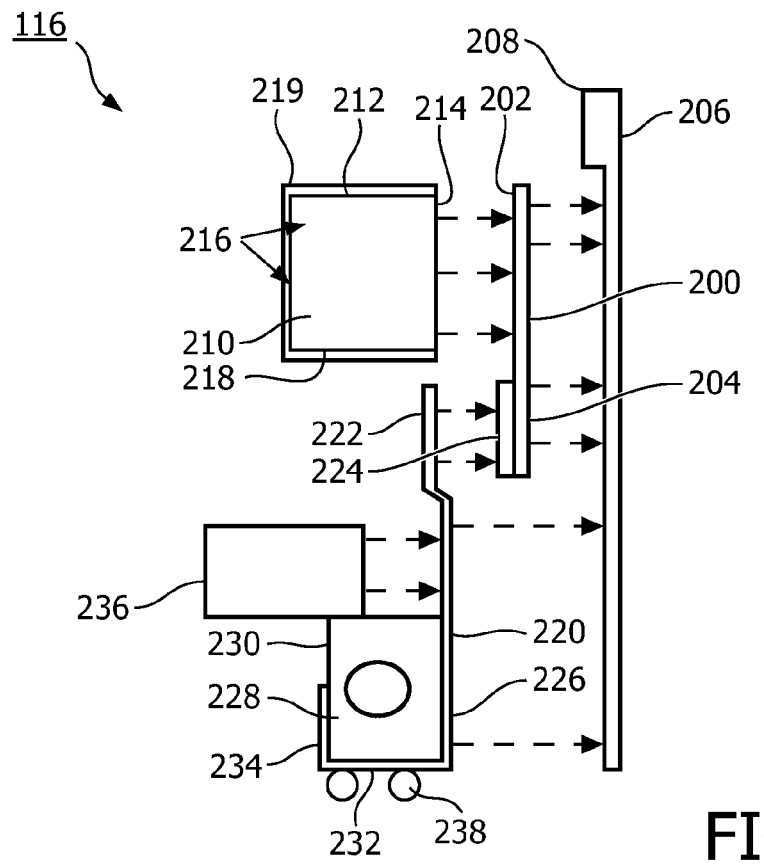
FIGS. 2 and 3 illustrate an example single-energy vertical detector leaf.
Figure 3:
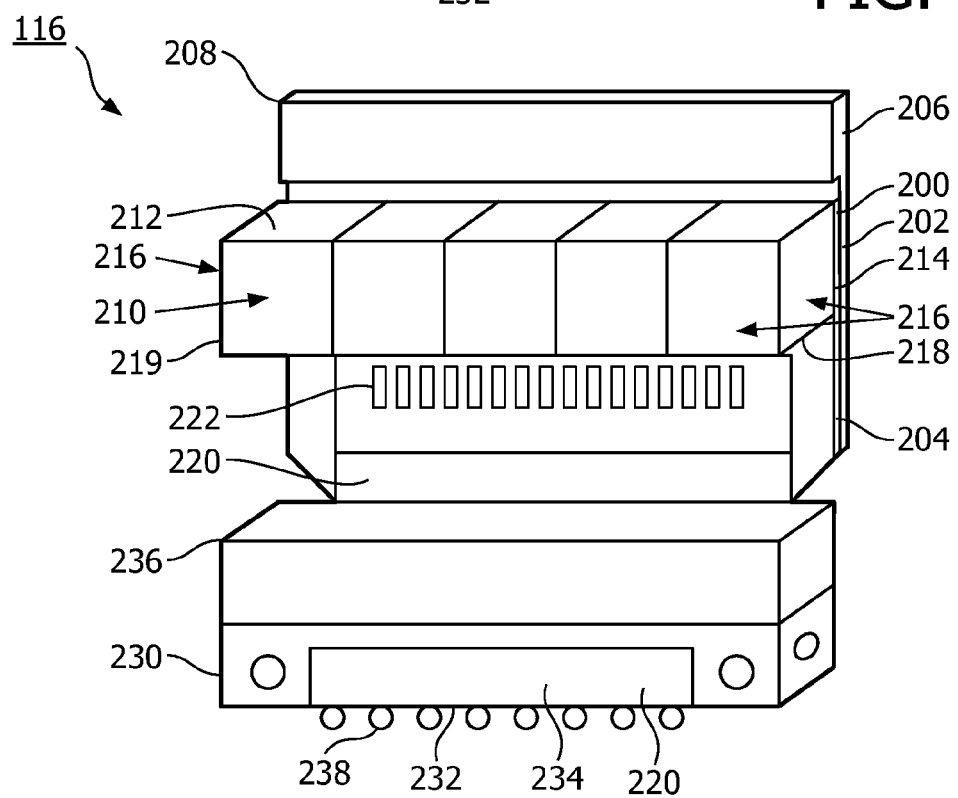
Figure 4:
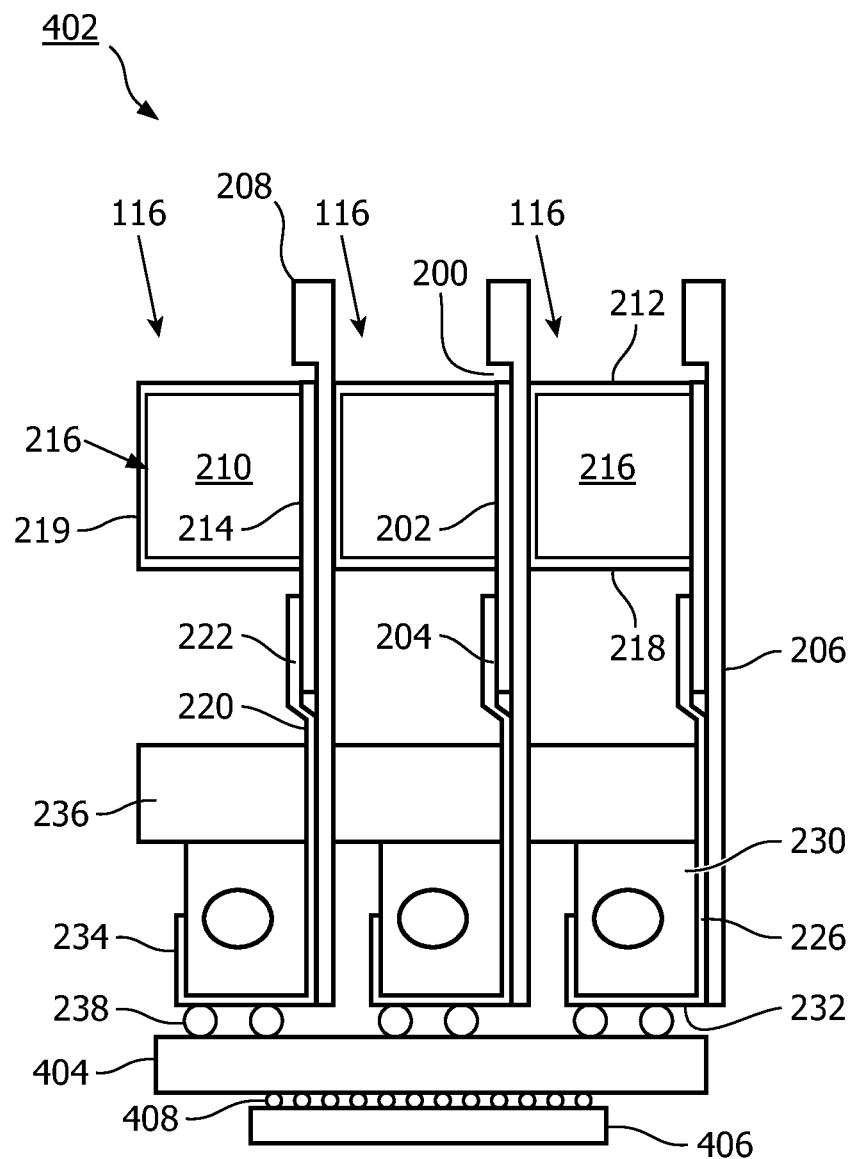
FIG. 4 illustrates a tile with a plurality of single-energy vertical detector leaves.

FIGS. 2, 3 and 4 show a non-limiting example of a single-energy detector leaf 118. FIG. 2 shows an exploded side view for the detector leaf 118, FIG. 3 shows a front perspective view of the detector leaf 118, and FIG. 4 shows a plurality of the detector leaves 118 in a detector tile with a substrate and processing electronics mounted below the leaves 118.

In the figures, a photo-sensor circuit board 200, which includes a photo-sensitive region 202 that is at least as long as a scintillator 210 affixed thereto, and a signal transferring region 204 that is at least as long as a corresponding signal receiving portion 222 of a flexible PCB 220, is affixed to a generally planar region of a support carrier 206, which includes a protrusion 208 extending from the carrier 206. The circuit board 200 can be glued and/or otherwise secured to the region of the carrier 206. The carrier 206 includes an x-ray radiation shielding material such as tungsten and/or other radiation shielding material, and the protrusion 208 extends over the installed circuit board 200, thereby shielding the circuit board 200 from x-ray photons impinging the protrusion 208. The signal transferring region 204 includes an electrical pathway in electrical communication with the photo-sensitive region 202, which may include photodiodes such as silicon (Si), gallium arsenide (GaAs), indium phosphide (InP), and/or other photodiodes, a charge coupled detector, a CMOS detector, and/or other radiation detectors.

The scintillator array 210 is affixed to the circuit board 200 in connection with the photo-sensitive region 202. The scintillator array 210 has a top 212 or radiation receiving side, a rear or optical photon transferring side 214, and three other sides 216 (one of which is not visible in FIG. 2) and a bottom side 218. A reflective coating 219 (e.g., a white paint) is applied to the top side 212, the three other sides 216 and the bottom side 218, which may facilitate directing optical photons in the direction of photo-sensitive region 202. In the illustrated embodiment, the scintillator array 210 is affixed to the photo-sensitive region 202 such that the optical photon transferring side 214 faces the photo-sensitive region 202. The scintillator array 210 can be affixed via an optical glue or otherwise. In FIG. 3, the scintillator array 210 is an N element array in which N=5 (five). In other embodiments, N can be eight (8), sixteen (16), thirty-two (32), two hundred and fifty-six (256) or other integer number.

The flexible PCB 220 is affixed to the signal transferring region 204 of the substrate 200. Generally, any known or other flexible PCB can be utilized. An example of a suitable flexible PCB is PCB having a base material including a laminate and/or a flexible polymer film, which may include, but is not limited to, one or more of a polyester (PET), a polyimide (PI), a polyethylene napthalate (PEN), a polyetherimide (PEI), a fluropolymer (FEP), and/or other material. The flexible PCB 220 also includes a bonding adhesive (e.g., polymer based) and one or more electrically conductive layers (e.g., copper, silver, etc.) including electrical pathways or conductive traces, which may be etched or otherwise formed in the one or more layers. The electrical pathway facilitates transferring an electrical signal generated by the photo-sensor region 202 in response to sensing optical photons.

In the illustrated embodiment, the portion 222 of the flexible PCB 220 is affixed to the signal transferring region 204 via a conductive adhesive or electrical solder 224. A suitable conductive adhesive includes, but is not limited to, an anisotropic conducting film (ACF) tape and/or other adhesive. As for the solder option, any solder process may be used. A support region 226 of the flexible PCB 220 rests against the carrier 206. The support region 226 allows for expansion and/or contraction and/or other movement of the flexible PCB 220. Optionally, a sub-portion of the support region 226 may be affixed or moveably affixed to the carrier 206. The illustrated flexible PCB 220 is shaped such that is includes a support region 228 for supporting a holding device 230. In the illustrated embodiment, the region 228 is located on a side of the PCB 220 opposite to that which faces the substrate 200 and the carrier 206, and extends in a direction away from the substrate 200 and the carrier 206.

In the illustrated embodiment, the support region 228 includes a first section 232, which extends from the flexible PCB 220 portion supported by the carrier 206, and generally perpendicularly with respect to the support carrier 206 and generally parallel to and under the bottom side 218 of the scintillator array 210. A second section 234 of the flexible PCB 220 extends from the first section 232, generally perpendicularly towards the bottom side 218 of the scintillator array 210 and generally parallel to the support carrier 206. The holding device 230 can be glued or otherwise secured in the support region 228. The illustrated holding device 230 includes a metal block with one or more alignment holes or material free regions that can be utilized for aligning the detector leaf 118 in a tile or module, and may allow for high mechanical accuracy for low cost buildup.

A radiation shield 236 is affixed to the holding device 230, between the bottom side 218 of the scintillator array 210 and the holding device 230. The radiation shield 236 includes one or more radiation opaque materials that substantially attenuate x-ray photons passing through the scintillator array 210 and hitting the radiation shield 236. The electrical contacts 238 are disposed on a side of the first section 232 opposite the side to which supports the holding device 230. In the illustrated embodiment, an electrical contact 238 includes one or more electrically conductive solder balls. In another embodiment, the electrical contact additionally or alternatively includes an electrically conductive epoxy.

FIG. 4 shows a sub-portion of a detector tile 402 including a plurality of the leaves 118 affixed to a substrate 404 and processing electronics 406. In FIG. 4, three (3) of the detector leaves 118 are shown. However, the tile 402 may include any number of detector leaves 118 such as eight (8), sixteen (16), thirty-two (32), two hundred and fifty-six (256) or another integer number. The substrate 404 is affixed to the first side of the first section 232 via the electrical contacts 238, and the processing electronics 406 are affixed to the substrate 404, via electrical contacts 408, which, like the contacts 238 may include solder, a conductive epoxy, and/or other electrically conductive adhesive.

The processing electronics 406 may include multiplexers, amplifiers, analog to digital converters, and/or other circuitry, in an integrated chip (IC), an application specific integrated circuit (ASIC), or the like. The substrate 404 is affixed to the first side of the first section 232 via the electrical contacts 238, and the processing electronics 406 are affixed to the substrate 404 via known (e.g., wire bond, flip-chip, etc.) or other technologies. In this configuration, the processing electronics 406 are disposed below the radiation shielding provided by the support carrier 206, the protrusion 208 and the radiation shield 236, and are shielded from x-ray radiation passing through the scintillator 210 by the support carrier 206, the protrusion 208 and the radiation shield 236.

Figure 5:
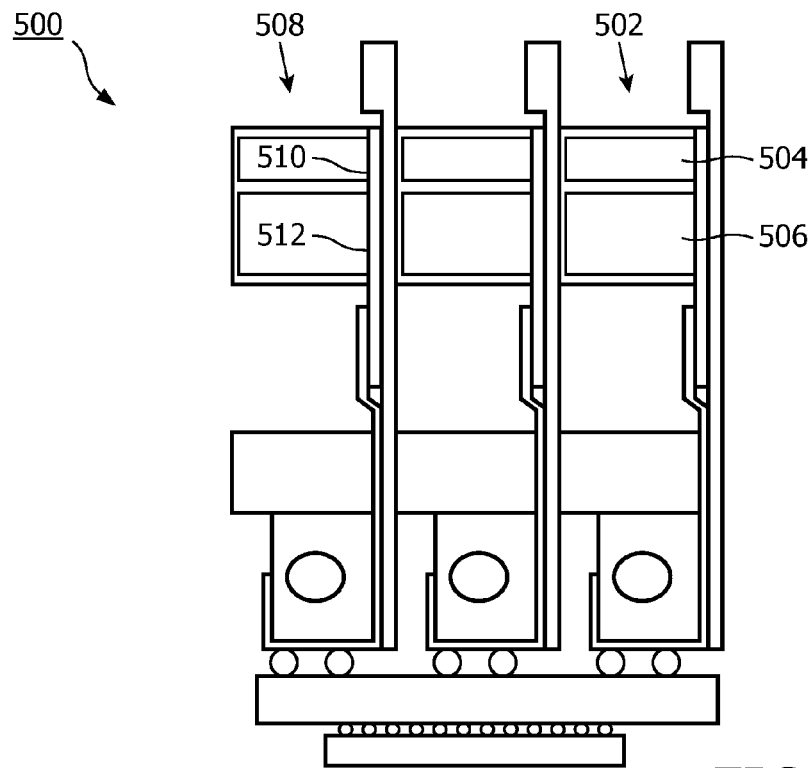
FIG. 5 illustrates a tile with a plurality of dual-energy vertical detector leaves.
Figure 6:
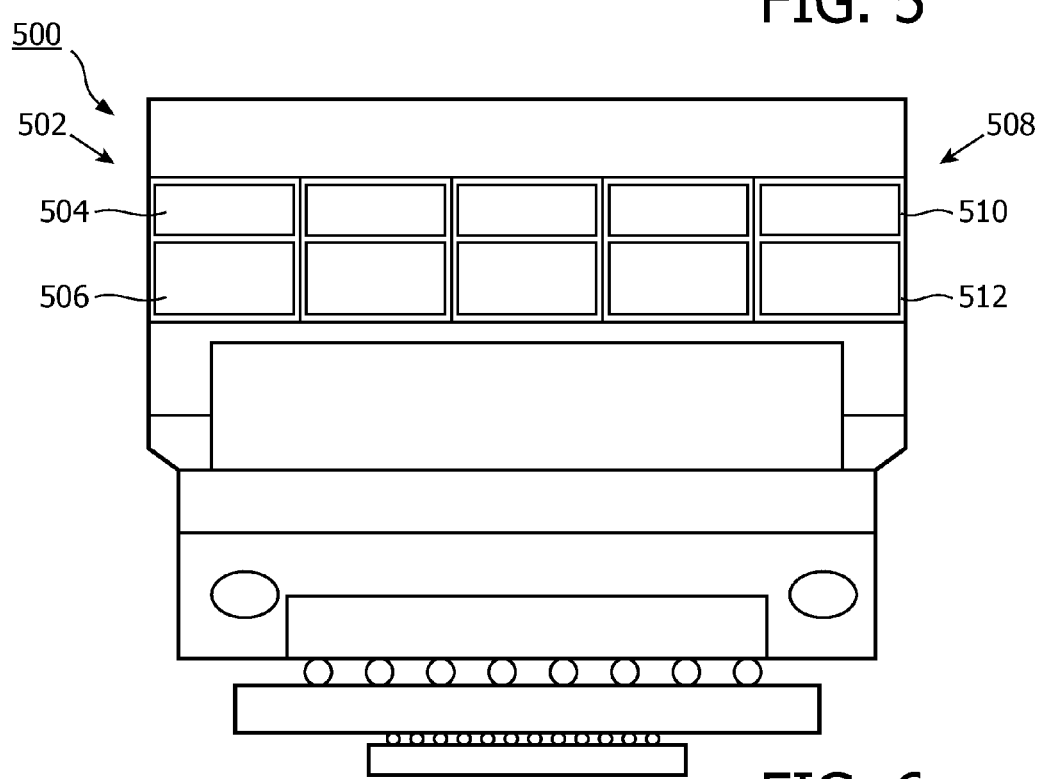
FIG. 6 illustrate an example dual-energy vertical detector leaf.

FIGS. 5 and 6 show a non-limiting example of a tile 500 with dual-energy (double decker) detector leaves 118. FIG. 5 shows a side view of the tile 500, and FIG. 6 shows a front view of the tile 500. Other embodiments include a more than two-energy resolving detector leaf. Generally, a different scintillator/photo-sensor sub-region pair is used for each different energy range. The illustrated dual-energy detector leaves 118 are substantially similar to the single-energy detector leaf shown in FIGS. 2-4, except that they include a scintillator array 502 having two different scintillation sub-regions, a top sub-region 504 and bottom sub-region 506, for separately detecting x-ray photons having energy in two different energy ranges (a lower and a higher range), and a photo-sensitive region 508 having two complementary photo-sensitive sub-regions, a first sub-region 510 and a second sub-region 512, for detecting corresponding optical photons.

Various scintillation materials can be utilized in the scintillator(s) described herein. Examples include, but are not limited to, GOS, ZnSe, ZnSe activated with tellurium (ZnSe: Te), europium (Eu) doped calcium iodide ($CaI_2$:Eu), strontium iodide ($SrI_2$:Eu) and barium iodide ($BaI_2$:Eu), ceramic alkaline earth iodides doped with $Eu^{2+}$, undoped SrI2, and/or other scintillators doped with $Eu^{2+}$, $Ce^{3+}$ or $Pr^{3+}$ or other activator ions. These scintillation materials can also be utilized in connection with other detectors such as the detector described in application Ser. No. 11/912,673, filed Oct. 26, 2007, and entitled "Double Decker Detector for Spectral CT,"

which is expressly incorporated herein in its entirety by reference, the detector described in application Ser. No. 12/067,942, filed Mar. 25, 2008, and entitled "Computer Tomography Detector Using Thin Circuits," which is expressly incorporated herein in its entirety by reference, and/or other detectors.

Figure 7:
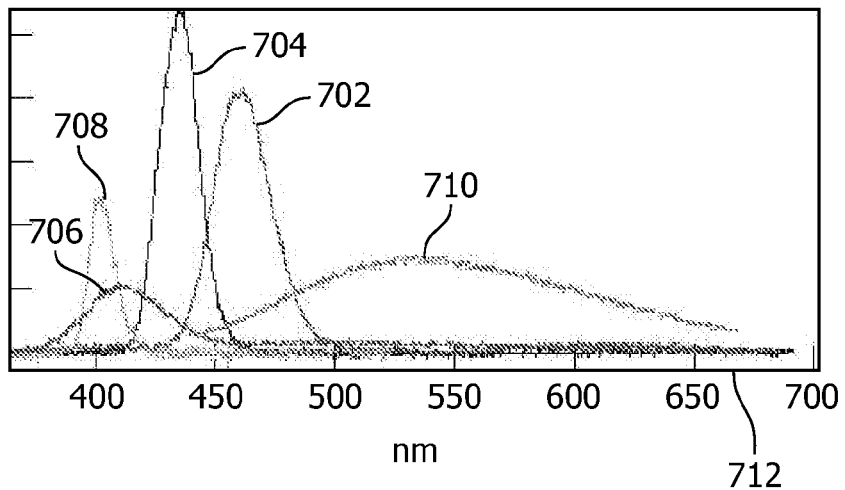
FIG. 7 illustrates emission spectra for various scintillation materials.

FIG. 7 shows emission spectra for various scintillation materials such as $CaI_2$:Eu 702, $SrI_2$:Eu 704, $BaI_2$:Eu 706, $SrBr_2$:Eu 708, and undoped $SrI_2$ 710 as a function of emission wavelength 712. From FIG. 7, the emission spectra of the halides doped with $Eu^{2+}$ are in the ultraviolet (UV)/blue part of the spectrum.

$SrI_2$:Eu is one of the most efficient scintillators known. Its efficiency surpasses 100000 photons/MeV, and its energy resolution can be extremely high (some 2%), approaching physical limits. Its melting point is low (538° C.), which renders it very suitable for single crystal growth, and its crystal structure is orthorhombic. $CaI_2$:Eu and $BaI_2$:Eu also possess very high light yields. As a consequence of the increasing covalency in the direction Ca to Ba, the compositions with the heavier alkaline earth ions are more water stable. A mixed rare earth halide $Si_{(1-n)}Ba_nI_2$ may be used, where the value of n is adjusted in the range $0.05<n<0.15$ to reduce the temperature coefficient of light output over a specific range of temperatures.

The scintillating materials can be prepared by physically mixing powered halides under exclusion of moisture and oxygen, putting the mixture in quartz ampoules, evacuating them, sealing them off and heating them at temperatures 150-50° C. below their melting temperature. Alternative, the carbonates can be reacted with the corresponding halide acid at temperatures 150-50° C. below the melting temperature of the product. Other techniques are also contemplated herein. Single crystals of $CaI_2$, $SrI_2$ and $BaI_2$ may be grown rather easily, e.g. by the Bridgman method. This is required when the optimum light yield is needed. In this method, a temperature gradient oven is used. The temperature gradient is large at the position in the oven where the temperature equals the melting temperature of the single crystal to be grown. Single crystals can also be grown using the Czochralski method.

With a composite scintillator comprising a halogen including $CaI_2$:Eu, $SrI_2$:Eu or $BaI_2$:Eu in a resin formed by mixing the powdered scintillator into the resin, crystal growth is not necessary. It is easy to ensure homogeneous distribution of the $Eu^{2+}$ activators in the $CaI_2$, $SrI_2$, $BaI_2$ or chemically mixed powders. Such a composite exhibits light losses due to scattering and optical absorption but such losses are more than compensated, by the very high light yield of these scintillators, compared to scintillators currently used. Furthermore, the composite mitigates mechanically structuring single crystals to obtain crystals of the right shape and size. Indeed, single crystals are very prone to cleavage; CaI2 crystals tend to be opaque, due to their hexagonal structure.

In addition, the composite scintillators can be structured by techniques like doctor blading or even printing. Furthermore, $CaI_2$:Eu, $SrI_2$:Eu or $BaI_2$:Eu are hygroscopic, and dicing and structuring of their crystals to render them applicable in CT has to be performed with care under special conditions. With the composite, dicing can be omitted, and, structuring, if at all needed, can be done when the μ-crystallites are already embedded in the resin, i.e. protected from air and water. Moreover, the effect of the sensitivity of the scintillator material to moisture can be reduced further by adding 'getter' like materials to the resin. CaO or $P_2O_5$, both white materials, react strongly with water and will protect the scintillator μ-crystals effectively.

Figure 8:
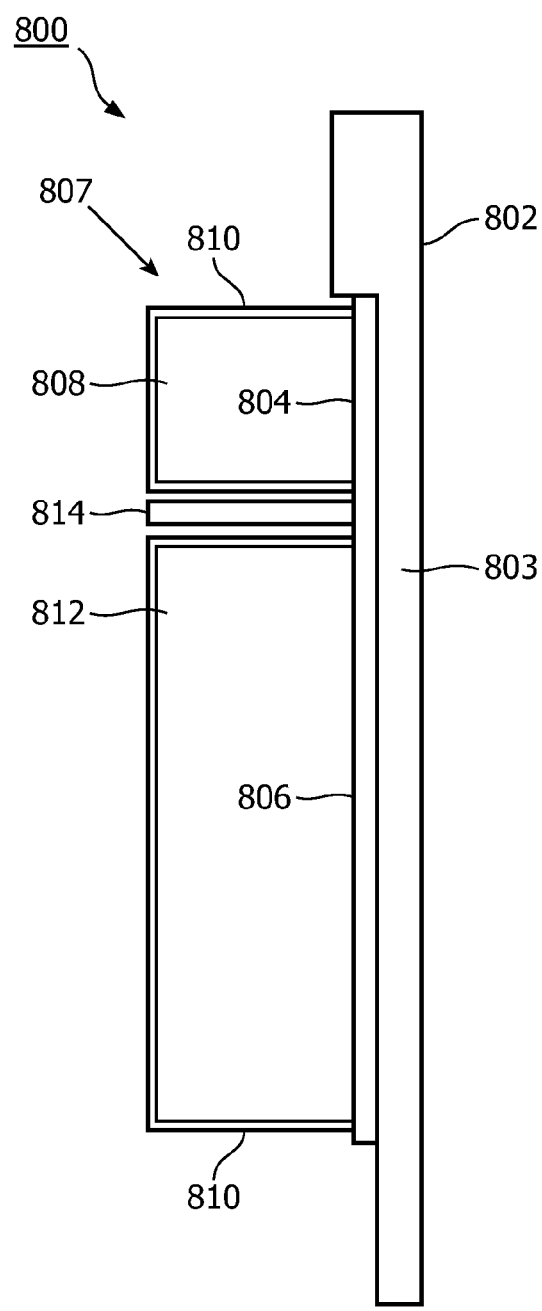
FIG. 8 illustrates a vertical dual-energy detector using ceramic or crystalline scintillators.
Figure 9:
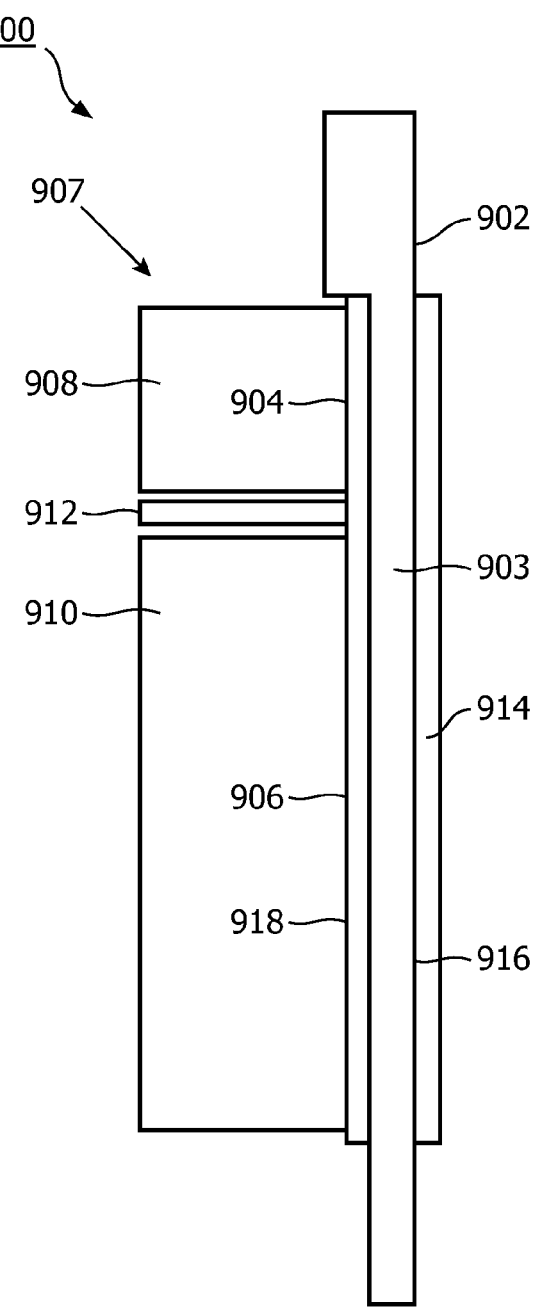
FIG. 9 illustrates a vertical dual-energy detector using composite scintillators.

As briefly discussed above, scintillators including GOS, ZnSe, ZnSe:Te, $CaI_2$:Eu, $SrI_2$:Eu, $BaI_2$:Eu, $SrI_2$, etc. can be utilized with the detectors described herein, including single and multi-energy detectors. FIGS. 8 and 9 shows examples with $SrI_2$ based scintillators. FIG. 8 shows a side view of a dual-energy (double decker) detector leaf 800 using ceramic or crystalline scintillators, and FIG. 9 shows a side view of a dual-energy (double decker) detector leaf 900 using composite scintillators.

Figure 10:
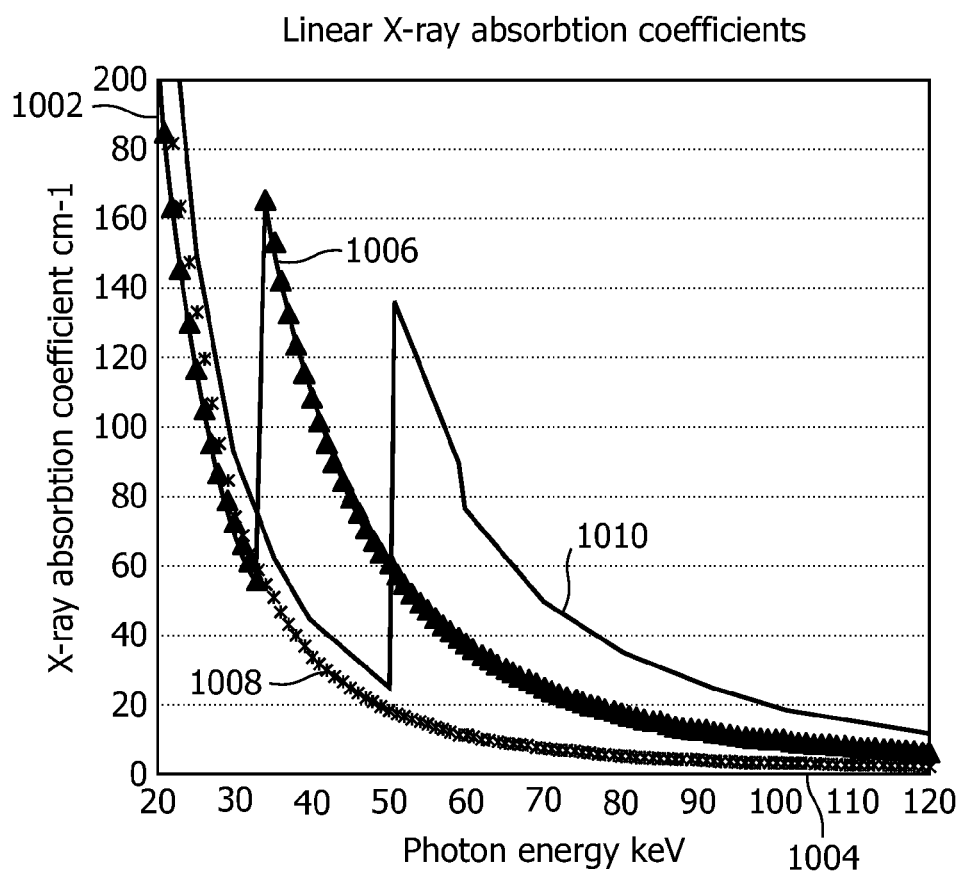
FIG. 10 illustrates x-ray absorption spectra for various scintillation materials.

Briefly turning to FIG. 10, example x-ray absorption coefficients for SrI2, ZnSe, and GOS are illustrated as a function of photon energy. In the illustrated embodiment, the y-axis 1002 represents x-ray absorption of coefficient in units of $cm^{-1}$ and the x-axis 1004 represents photon energy in units of KeV. A first curve 1006 represents the x-ray absorption of coefficient of $SrI_2$, a second curve 1008 represents the x-ray absorption of coefficient of ZnSe, and a third curve 1010 represents the x-ray absorption of coefficient of GOS.

From FIG. 10, the linear x-ray absorption coefficient of $SrI_2$ follows that of ZnSe up to 30 keV. Between 30 keV and 50 keV, the linear x-ray absorption coefficient of $SrI_2$ is much higher than that of ZnSe, and it also absorbs these relatively-soft x-rays better than GOS, which may improve the response to iodine-containing tracers. At higher photon energies, the $SrI_2$ absorption is substantially less than that of GOS, enabling spectral resolution of heavy elements.

Thus the overall spectral resolution is at least as good as that of ZnSe. For 120 kVp x-rays, which have passed though the patient, a thickness of 300 microns of $SrI_2$ is equivalent in x-ray absorption to a thickness of 1 mm of ZnSe.

Returning to FIG. 8, the dual-energy spectral CT detector 800 includes a radiation shield 802, a detector array 803 including top and bottom photodiodes 804 and 806, a scintillator array 807 including a top scintillator 808 including a $MI_2$:Eu (M=Ca, Sr, Ba) scintillation crystal. The height of the crystal depends on the x-ray absorption of the scintillator and is about 300 microns for SrI2:Eu. The crystal is coated with a reflective white coating 810 which may incorporate diffusion-retarding additives SiOx and a bottom scintillator 812 including a GOS:Pr, Ce scintillation crystal with the reflective white coating 810, and an aluminum foil 814 between the top and bottom scintillators 808 and 812, which may mitigate or reduce optical cross-talk therebetween.

With $SrI_2$, the optimal thickness to absorb about half the x-ray fluence is only about 0.3 mm. So it will be desirable to use a light pipe to carry the light efficiently to a photodiode with a relatively large area. A suitable light pipe (not visible in FIG. 8) is described in US publication 2010/0220833, filed May 10, 2010, and entitled "Detector Array for Spectral CT," which is incorporated herein by reference in its entirety. Alternatively, the light pipe may be placed below the $SrI_2$ layer. Although this geometry reduces the sensitivity to the softest x-rays, and thus reduces the spectral contrast, it also provides thick solid barriers in every direction to diffusion of water vapor or oxygen, which may otherwise attack the $SrI_2$.

Turning to FIG. 9, the dual-energy spectral CT detector 900 includes a radiation shield 902, a detector array 903 including top and bottom photodiodes 904 and 906, a scintillator array 907 including a top scintillator 908 including a $MI_2$:Eu (M=Ca, Sr, Ba) large grain powder 20% in clear resin (with a height that depends on the halide density and is 6.5 mm for SrI2) and a bottom scintillator 910 including 20% GOS:Pr, Ce large grain powder (e.g., >5 μm) in clear resin (by mass) (height 10 mm), an opaque reflecting layer 912 of aluminum foil between two white reflecting layers between the top and bottom scintillators 908 and 910 to prevent optical cross-talk therebetween. A back surface 916 of the photo-sensor array 903, which is opposite a side 918 to which the scintillator is affixed, includes a white reflective coating with a reflective layer, such as white reflective paint or a bright metallic layer.

If $SrI_2$ is employed as a composite scintillator in the top scintillator 908, being dispersed as a powder in a transparent resin (such as an epoxy or mercaptan resin, which may or may not be UV-curable), then an adequate photodiode area can be achieved by diluting it to 10-30% concentration such as 20% concentration, rather than using a light pipe. The composite forms its own light pipe. Thus, for a 0.3 mm-equivalent $SrI_2$ height, the photodiode may be 6.5 mm high. This is doubly advantageous, because at this dilution the light is also brought efficiently to the photodiode's sensitive surface through the 1-1.5 mm thickness width of the composite, in which it would suffer severe scattering at higher concentrations.

In the same way, the bottom scintillator 910 may be formed of a GOS composite scintillator, and that too may advantageously comprise the (GOS) powder dispersed at about 20% concentration (by mass) in the optical resin. Elements of such a detector may thus be manufactured by sequentially casting, first the GOS composite resin, and then the $SrI_2$ composite resin, onto the surface of a photodiode array in a suitable Teflon mould with a metal foil separator between the two composites. It may be necessary to cast to a greater depth than the 1.2 mm required, and machine off the extra afterwards, to remove excess material formed by the capillary.

Figure 11:
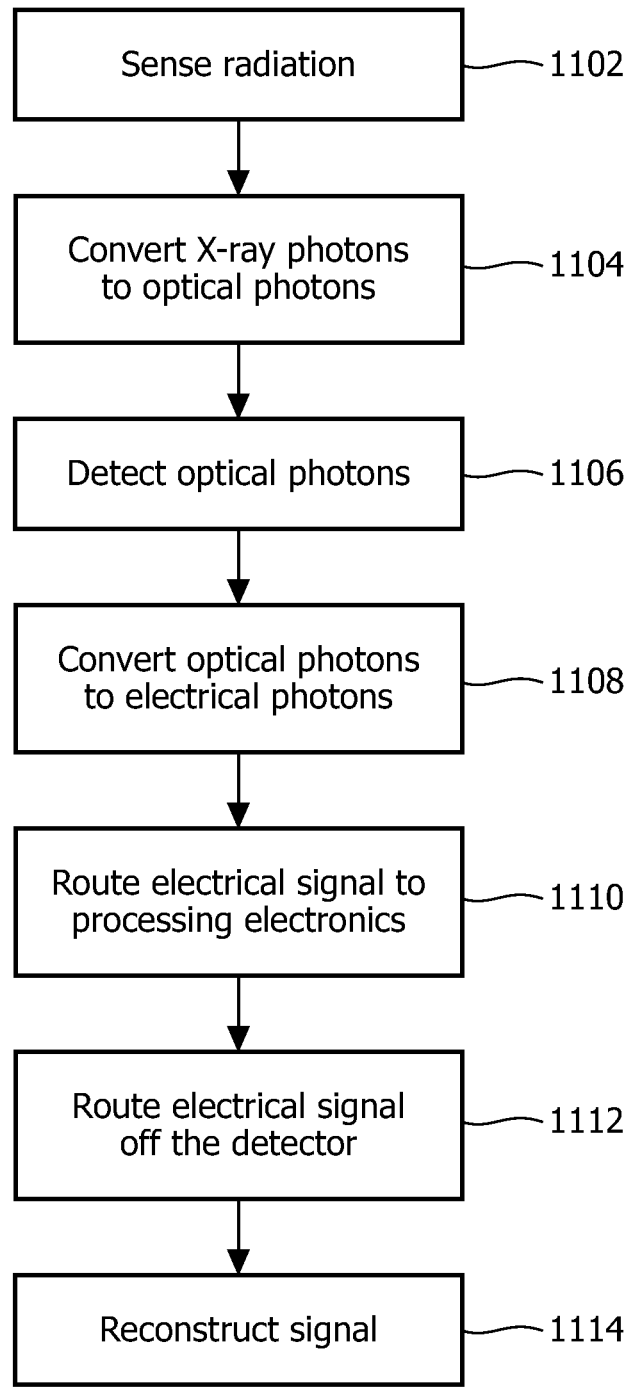
FIG. 11 illustrates an example method ggffjj.

FIG. 11 illustrates an imaging method.

At 1102, x-ray radiation is sensed by a radiation sensitive detector of the radiation leaves 118 of the imaging system 100 described herein.

At 1104, the x-ray radiation is converted, via a single or multi-energy scintillator array of the radiation sensitive detector, to optical photons indicative of the detected radiation.

At 1106, the optical photons are detected via a single or multi-photo-sensor of the radiation sensitive detector.

At 1108, the optical photons are converted by the photo-sensor to an electrical signal indicative of the detected radiation.

At 1110, the signal is routed to processing electronics of the detector via the flexible PCB described herein. As described herein, the flexible PCB electrically couples the photo-sensor and the processing electronics, which are disposed below a radiation shield, which is disposed below the scintillator array.

At 1112, the signal is routed from the processing electronics of the detector off the detector to a processor.

At 1114, the signal is reconstructed, generating volumetric image data indicative of the received radiation.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

What is claimed is:

1. A vertical radiation sensitive detector array, comprising:
    at least one detector leaf, comprising:
        a scintillator array, including, at least, atop side which receives radiation, a bottom side and a rear side;
        a photo-sensor circuit board, including:
            a photo-sensitive region, optically coupled to the rear side of the scintillator array; and
            a signal transferring region;
        processing electronics disposed below the scintillator array;
        a support carrier including a radiation shielding material, wherein the photo-sensor circuit board is fixedly mounted to the support carrier, which shields the photo-sensor circuit board from impingent radiation;
        a flexible circuit board electrically coupling the photo-sensitive region and the processing electronics, the flexible circuit board including;
            a first portion fixedly mounted to the signal transferring region; and
            a second region moveably supported by the support carrier; and
        a radiation shield disposed below the bottom of the scintillator array, between the scintillator and the processing electronics, thereby shielding the processing electronics from residual radiation passing through the scintillator array.

2. The detector array of claim 1, the flexible circuit board, further comprising:
    a first section, which extends from the support region of the flexible circuit generally perpendicularly with respect to the carrier and generally parallel to and under the bottom side of the scintillator array; and
    a second section, which extends from the first section generally perpendicularly towards the bottom side of the scintillator array and generally parallel to the carrier,
    wherein the processing electronics are located below the first section of the flexible circuit board.

3. The detector array of claim 2, further comprising:
    a holding device carried by the flexible circuit board, wherein the holding device includes at least one alignment hole for aligning the detector array with respect to one or more other detector arrays in a detector tile.

4. The detector array of claim 3, wherein the support region, the first section and the second section of the flexible circuit board form a support region, and the holding device is secured in the support region and located above the processing electronics.

5. The detector array of claim 1, wherein the scintillator array includes gadolinium oxysulfide.

6. The detector array of claim 1, the scintillator array, comprising:
    a top scintillator array including zinc selenide; and
    at least one other scintillator array disposed below the top scintillator array and including gadolinium oxysulfide.

7. The detector array of claim 1, the scintillator array, comprising:
    a top scintillator array including a halide scintillation material; and
    at least one other scintillator array disposed below the top scintillator array and including gadolinium oxysulfide.

8. The detector array of claim 7, wherein the top scintillator array includes at least one of a ceramic scintillator, a crystalline scintillator, or a composite scintillator.

9. The detector array of claim 7, the halide scintillation material including at least one of calcium iodide, strontium iodide, or barium iodide.

10. The detector array of claim 7, wherein the halide is doped with europium.

11. A method, comprising:
    detecting radiation via at least one detector leaf of a detector array of an imaging system, the detector leaf comprising:
        a scintillator array, including, at least, atop side which receives radiation, a bottom side and a rear side;
        a photo-sensor circuit board, including:
            a photo-sensitive region, optically coupled to the rear side of the scintillator array; and a signal transferring region;
processing electronics disposed below the scintillator array;
a support carrier including a radiation shielding material, wherein the photo-sensor circuit board is fixedly mounted to the support carrier, which shields the photo-sensor circuit board from impingent radiation;
a flexible circuit board electrically coupling the photo-sensitive region and the processing electronics, the flexible circuit board including;
    first portion fixedly mounted to the signal transferring region; and
    a second region moveably supported by the support carrier; and
a radiation shield disposed below the bottom of the scintillator array, between the scintillator and the processing electronics, thereby shielding the processing electronics from residual radiation passing through the scintillator array;

generating a signal indicative of the detected radiation; and
reconstructing the signal, generating volumetric image data.

12. The method of claim 11, wherein the at least one detector leaf includes a single-energy vertical detector.

13. The method of claim 11, wherein the at least one detector leaf includes a multi-energy vertical detector.

14. The method of any of claims 11 to 13, wherein the scintillator array includes at least one of a europium doped calcium iodide, europium doped strontium iodide, europium doped barium iodide, or an undoped strontium iodide scintillation material.

15. The method of claim 11, wherein the scintillator array includes a ceramic or crystalline scintillator.

16. The method claim 11, wherein the scintillator array includes a composite scintillator.

* * * * *